Aug. 25, 1936. B. C. BRISTOW 2,052,077
PISTON RING AND ASSEMBLY THEREFOR
Filed Nov. 1, 1933
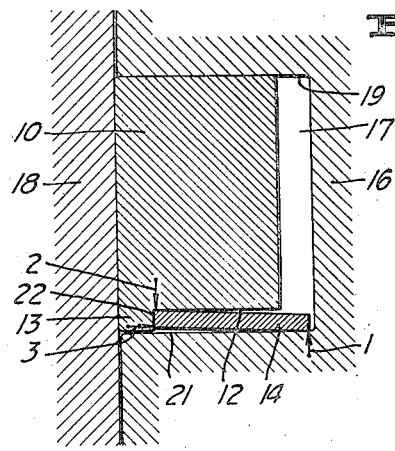
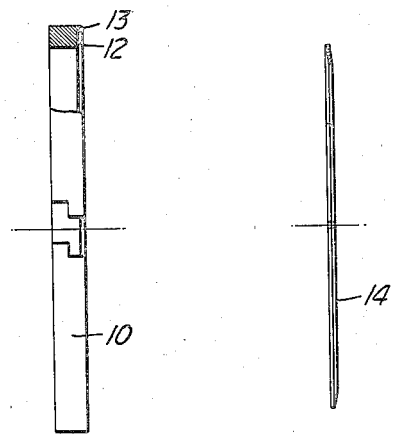
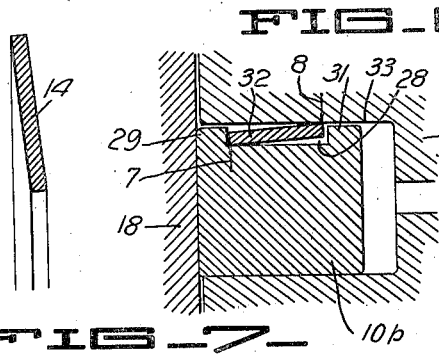
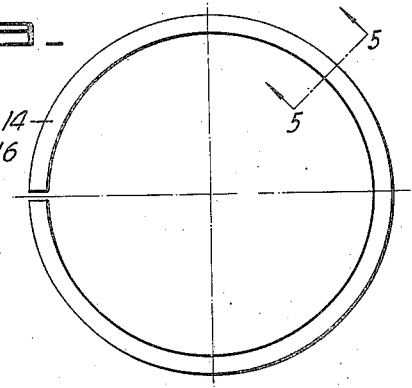
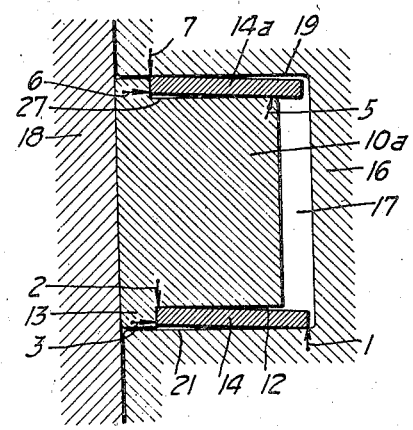
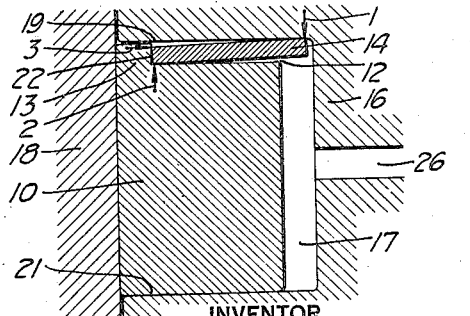
INVENTOR
Barnard C. Bristow
BY
White, Prost, Flehr & Sothro
ATTORNEYS Patented Aug. 25, 1936

2,052,077

UNITED STATES PATENT OFFICE 2,052,077

PISTON RING AND ASSEMBLY THEREFOR

Barnard C. Bristow, San Francisco, Calif.

Application November 1, 1933, Serial No. 696,194

2 Claims. (Cl. 309—24)

This invention relates generally to piston assemblies such as are utilized in internal combustion engines, compressors and the like, and to piston rings and other individual parts which enter into such assemblies.

It is an object of the invention to provide an assembly of the above character which will afford more adequate provision against leakage about the piston ring and ringlands, and which can be utilized both for the rehabilitation of worn assemblies and for incorporation in the structures at the time of initial manufacture.

A further object of the invention is to provide a piston assembly of the type utilizing a dished resilient segment positioned at one end of the piston ring, which will avoid detrimental engagement between the outer edge of the segment and the adjacent cylinder walls.

Another object of the invention is to provide a novel type of dished resilient segment for use in conjunction with piston assemblies, which can be readily manufactured to accurate dimensions and which can be readily incorporated with a piston ring to afford more adequate sealing.

A further object of the invention is to provide an assembly of the above character which will more adequately compensate for wear of the ringland surfaces, which will tend to minimize pounding of the ring in the event the ringlands have become worn, and which will tend to straighten badly worn ringlands in which rings of standard construction can not be properly fitted.

Further objects of the invention will appear from the following description in which the preferred embodiment of my invention has been set forth in detail in conjunction with the accompanying drawing.

Referring to the drawing:

Figure 1 is a cross-sectional detail on an enlarged scale, showing a piston assembly incorporating the present invention.

Figure 2 is a side-elevational view, partly in cross-section, illustrating a piston ring formed in accordance with the present invention.

Figure 3 is a side-elevational view, partly in cross-section, illustrating a resilient segment such as is utilized in the present invention.

Figure 4 is a plan view of the segment illustrated in Figure 3.

Figure 5 is an enlarged cross-sectional detail taken along the lines 5—5 of Figure 4.

Figure 6 is an enlarged cross-sectional detail similar to Figure 1, showing an assembly incorporating the present invention for the purpose of sealing against oil leakage.

Figure 7 is an enlarged cross-sectional detail similar to Figure 1, showing an assembly for a compression ring having both upper and lower seals, to tend to render the ring free floating.

Fig. 8 is an enlarged cross-sectional view of a modification embodying a dished ring disposed in a recess between the inner and outer faces of a compression ring.

My invention is intended to be used with pistons of standard construction, such as are utilized in internal combustion engines, steam engines, compressors, and like appliances. In the past, piston assemblies for such appliances have generally made use of pistons provided with a plurality of annular grooves, fitted with split metal piston rings which expand upon the side walls of the cylinder to form a sealing engagement. In internal combustion engine practice, and likewise in certain compressors, at least one of these rings is designed primarily to avoid undesired leakage or pumping of oil, rather than primarily for the purpose of withstanding pressure. The effectiveness of such a piston ring to afford adequate sealing depends not only upon securing proper contact between the outer peripheral surface of the ring and the adjacent cylinder walls, but also upon the engagement between the side faces of the ring and the adjacent opposed surfaces or ringlands of the associated piston groove. It is not difficult to afford proper sealing contact between the outer peripheral surface of the ring and the adjacent cylinder walls, but sealing against leakage around the piston rings—that is, between the side faces of the rings and the adjacent ringlands—is recognized as being difficult. In practice the side faces of the rings are ground and the ringlands of the piston are machined, but, due to inaccuracy and metal warpage, a perfect seal is not provided. During a "breaking in" period of use, the ring sides form a seat upon the ringlands by impact. Such a seat does not form a perfect seal, however, and further pounding during use causes continued wear with resultant increased leakage. To properly repair such a worn assembly is somewhat difficult and generally necessitates the use of oversized piston rings which must be fitted with respect to remachined ringlands.

It has been proposed, particularly for the purpose of repairing worn piston assemblies, to insert one or more thin metal segments between one side face of the piston ring and the adjacent ringland. These segments are made to a diameter substantially larger than that of the cylinder, so that when installed they are contracted with their outer edges bearing upon the cylinder walls. They are also formed with a certain amount of dishing, so that when contracted in a piston assembly the amount of dishing is increased somewhat to exert a thrust upon the associated ring. Contraction increases the radial pressure and the side pressure in relation to the increased dishing caused by contraction. If great care and precision are not exercised, the segment will press too heavily upon the cylinder walls and mutilation will result, or, if not stressed to a sufficient degree, proper sealing will not be afforded.

As has been indicated by the aforesaid objects of the invention, in the assembly disclosed herein segments are provided which can be readily manufactured to accurate dimensions, and these segments co-operate with the piston rings in such a manner that detrimental engagement of the outer edges of the segments with the cylinder walls is avoided. Likewise, in my invention the segments are not stressed by contracting the same, but they actually retain substantially their original diameter when incorporated in the assembly.

Referring now to the drawing, in Figure 2 there is shown a piston ring 10, which is formed split as in present day practice. One side face of this ring is formed to provide an annular recess 12 which serves to afford an outer annular shoulder 13.

The resilient segment which I prefer to employ with the ring of Figure 2 has been illustrated in Figures 3 to 5 inclusive. This segment, indicated generally at 14, is formed of relatively thin, flat spring metal, it is circular in contour with respect to its inner and outer edges, and it is dished to a substantial degree. The amount of dishing of course depends upon the nature of the assembly in which the segment is to be employed, but in practice I have found that a dishing of about 15° gives good results. It will be noticed that the outer diameter of this segment is considerably smaller than the internal diameter of the shoulder 13 on ring 10. The significance of this proportioning will presently be explained in detail. However, at present it may be noted that the outer diameter of the segment conforms substantially to the inner diameter of the shoulder 13, when the ring 10 is contracted within a cylinder.

Figure 1 shows a piston ring and a segment as described above, assembled in the groove of a piston, as in an internal combustion engine. Wall 16 in this instance represents a portion of the piston; groove 17 is one of the circumferential grooves in which a piston ring is disposed; and wall 18 represents a portion of the cylinder. The upper and lower opposed faces 19 and 21 of the groove 17 are the ringlands between which the piston ring 10 is fitted. Segment 14 is shown disposed within the recess 12, with its concave face disposed upwardly. In forming this assembly the segment 14 must of course be sprung over the piston to position it within the groove 17, and the piston ring must likewise be sprung into this groove with the recess 12 accommodating the segment, after which the ring is contracted and the assembly placed within the cylinder. In this assembly the diameter of the inner face 22 of shoulder 13 is in conformance with the outer diameter of the segment 14 at the time of manufacturing the same. However, the segment is sprung in a lateral direction, and because of its sprung condition it tends to press outwardly upon shoulder 13 to press the ring 10 more tightly against the cylinder walls. The amount of this outward radial pressure upon the piston ring is preferably such as to substantially compensate for weakening of the ring due to the formation of recess 12. The springing of the segment 14 within its elastic limit likewise tends to continuously force the piston ring upwardly against the ringland 19, to afford a more adequate seal at this point. Now, assuming that pressure occurs downwardly from a chamber above the piston, contact between the outer peripheral surfaces of the piston ring 10 and the side walls of the cylinder affords an effective seal. Contact between the upper side surface of the piston ring and the ringland 19 tends to minimize leakage of pressure to the space behind the piston ring. However, gas pressure leakage behind the piston ring is effectively prevented from seeping below the ring by virtue of the segment 14. The points at which the segment 14 effects sealing have been indicated by the arrows 1, 2 and 3. Point 1 represents a narrow annular area of contact (substantially a line contact) between the outer face of the segment 14 and the ringland 21, along the inner edge of the segment. Point 2 represents a narrow annular area of contact between the inner face of the segment 14 and the bottom surface of recess 12, at the outer edge of the segment. Point 3 represents engagement of a narrow annular area between the outer edge of the segment and the inner face 22 of the shoulder 13. These areas of contact are relatively continuous about the assembly because of the stressing to which the segment is subject and because the segment is accurately formed in the first instance. It will also be noted that pressure existing behind the piston ring tends to press downwardly upon the segment 14 to secure an even more forcible sealing contact at the points 1 and 3.

It is of course to be understood that Figure 1 has been exaggerated with respect to the proportioning of the parts and with respect to the clearances afforded. Ordinarily, the clearances will of course depend upon the tolerances used during manufacture and upon the amount of wear to which the parts have been subjected. In the event considerable clearance may exist between the ends of the piston ring and the ringlands 19 and 21, it is evident that the stressing of segment 14 will tend to effect an adequate seal in spite of such clearances, and movements of the ring with respect to the piston will be cushioned to minimize pounding. Likewise, slight downward movement of the ring with respect to the associated piston will tend to stress the segment to an even greater amount than normal to force the points of sealing contact more effectively into engagement. When the assembly is in use, slight movement of the ring with respect to the piston causes sliding movement between segment 14 and the ringland 21, so that the point of sealage 1 is seated more effectively by rubbing action, as distinguished from pounding or impact.

Aside from the features which have been pointed out above, the position of the shoulder 13, engaged with the outer edge of the segment 14, prevents direct contact between the outer edge of the segment and the cylinder walls. Likewise, engagement between the outer edge of the segment and the inner face 22 of the shoulder 13 affords an added area of sealing engagement, as has been previously explained.

Figure 6 represents a modified piston assembly, for the purpose of preventing too great a flow of oil upwardly between the piston and the cylinder walls, and to prevent oil pumping. Thus, in this case the ring 10 is shown inverted, with its recess uppermost. Segment 14 is also applied upon the upper face of the ring, with its concave face downwardly. The segment affords three points of sealing engagement with the ringland 19 and the ring 10, substantially as has been described with respect to Figure 1. Therefore, any oil finding its way behind the ring 10 is prevented from passing upwardly beyond the ring, due to the seal thus afforded. If desired, the groove 17 in this instance may be in communication with the crankcase of the engine or compressor with which the assembly is employed, by way of ducts 26.

In Figure 7 there is shown a further modified form of assembly, in which segments are provided at both the upper and lower sides of a compression ring. In this case, in addition to providing the annular recess 12 at the lower side of the ring 10a, the opposite side of the ring is provided with another annular recess 27. Recess 12 accommodates segment 14, as in Figure 1, and the upper recess 27 accommodates a similar segment 14a. Both the segments 14 and 14a are stressed laterally so that they press in opposite directions upon the ring and likewise tend to expand the ring against the cylinder walls. Points of sealing engagement 1, 2 and 3 are afforded by the segment 14, and segment 14a also provides points of sealing engagement 5, 6 and 7. It is apparent that in such an assembly the upper segment 14a will largely seal the ring against leakage of pressure behind the piston ring, while pressure leaking to a point behind the piston ring is further sealed against leakage beneath the ring, by the lower segment 14. Therefore, such a ring will tend to be free floating, it will not be pressed with undue force against the sides of the cylinder walls by virtue of pressure behind the same, and it will not tend to be pressed into tight gripping engagement with the ringlands during operation of the engine or compressor in which the assembly is employed. A minimum of friction therefore results, in addition to sealing against leakage of pressure.

A further modification of the invention is shown in Fig. 8. In this instance the piston ring 16b has one of its side faces provided with an annular recess 28, having both outer and inner annular shoulders 29 and 31. A dished segment 32, similar to segment 14 except as to dimensions, is positioned within recess 28, and this segment has forcible sealing contact with the bottom face of the recess and the adjacent ringland 33, as indicated by arrows 7 and 8 respectively. If desired segment 32 may be proportioned so as not to have sealing contact with the inner face of shoulder 29, since ample sealing is afforded at points 7 and 8.

It is evident that my invention is of particular value in repairing or rehabilitating worn piston assemblies. Increased tolerances due to wear can be compensated for, and much work in fitting in new rings can be obviated. My assembly can even be used successfully in rehabilitating assemblies where the ringlands have been worn to a degree where they are non-parallel, since the sealing engagement is confined to a substantially line contact near the bottom of the piston groove. In fact, a worn assembly rehabilitated by my invention actually has a tendency to straighten non-parallel ringlands, due to the shifting of the points of sealing near the bottoms of the piston grooves.

It is also apparent that the parts making up my assembly can be readily manufactured to the dimensions desired. For example, the segments can be made by a punching operation which simultaneously applies the desired dish, after which they can be accurately ground to the desired inner and outer diameters.

I claim:

1. In an assembly of the character described, a piston ring fitted within an associated piston groove, said ring having an annular recess formed in one of its side faces whereby an annular outer shoulder is provided, and the inner peripheral surface of said shoulder being substantially cylindrical, and a dished annular shaped segment of resilient material positioned within said recess and stressed laterally within its elastic limit, one face of said segment adjacent the inner edge of the same having substantially uninterrupted annular sealing engagement with the adjacent ringland surface, the other face of the segment adjacent the outer edge of the same having substantially uninterrupted annular sealing engagement with the bottom surface of the recess, and the outer periphery of the segment having substantially uninterrupted annular contact with the inner peripheral surface of said shoulder.

2. In an assembly of the character described, a piston ring fitted within an associated piston groove, said ring having an annular recess formed in one of its side faces whereby an annular outer shoulder is provided, the inner peripheral surface of said shoulder being substantially cylindrical and the bottom of the recess which forms the adjacent annular side of the ring being substantially planar, and a relatively thin dished annular segment of resilient material positioned within said recess and stressed laterally within its elastic limit, one face of said segment adjacent the outer edge of the same having substantially uninterrupted annular sealing contact with the adjacent ringland surface, the other face of the segment adjacent the outer edge of the same having substantially uninterrupted annular sealing engagement with the bottom surface of the recess, and the outer periphery of the segment having substantially uninterrupted annular contact with the inner face of said shoulder, the outer diameter of the segment being substantially the same as when unstressed apart from the assembly.

BARNARD C. BRISTOW.